United States Patent
Christidis et al.

(10) Patent No.: US 11,823,178 B2
(45) Date of Patent: Nov. 21, 2023

(54) OPTIMIZATION OF HIGH VOLUME TRANSACTION PERFORMANCE ON A BLOCKCHAIN

(71) Applicant: International Business Machines Corporation, Armonk, NY (US)

(72) Inventors: Konstantinos Christidis, Raleigh, NC (US); Nitin Gaur, Round Rock, TX (US); Yun Wang, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 228 days.

(21) Appl. No.: 15/815,944

(22) Filed: Nov. 17, 2017

(65) Prior Publication Data

US 2019/0156332 A1    May 23, 2019

(51) Int. Cl.
*G06Q 20/36* (2012.01)
*G06Q 20/06* (2012.01)
(Continued)

(52) U.S. Cl.
CPC ..... *G06Q 20/3674* (2013.01); *G06Q 20/0658* (2013.01); *G06Q 20/0855* (2013.01); *G06Q 20/3829* (2013.01); *H04L 9/14* (2013.01); *H04L 9/3239* (2013.01); *H04L 9/3236* (2013.01); *H04L 9/50* (2022.05); *H04L 2209/56* (2013.01)

(58) Field of Classification Search
None
See application file for complete search history.

(56) References Cited

U.S. PATENT DOCUMENTS 7,548,928 B1 * 6/2009 Dean .................. G06F 16/90344
8,255,398 B2 * 8/2012 Bhattacharjee ......... H03M 7/30
707/736
(Continued)

FOREIGN PATENT DOCUMENTS

CN        107122675 A     9/2017
JP       2017531256 A    10/2017
(Continued)

OTHER PUBLICATIONS

Garefalakis, P et al. "ACaZoo: A Distributed Key-Value Store Based on Replicated LSM-Trees", 2014 IEEE 33rd International Symposium on Reliable Distributed Systems. (Year: 2014).*
(Continued)

*Primary Examiner* — Neha Patel
*Assistant Examiner* — Clay C Lee (57) ABSTRACT

An example operation may include one or more of identifying a newly proposed transaction of a blockchain, initiating a consensus operation to determine whether to authorize the newly proposed transaction, retrieving a key-value pair identified from a previous transaction, comparing an index value associated with the key-value pair of the previous transaction to an index value associated with a key-value pair of the newly proposed transaction, and providing an affirmative consensus to accept the newly proposed transaction in the blockchain when the index value associated with the key-value pair of the previous transaction is contiguously sequential with the index value associated with the key-value pair of the newly proposed transaction.

17 Claims, 8 Drawing Sheets

(51) Int. Cl.
*H04L 9/32* (2006.01)
*G06Q 20/38* (2012.01)
*H04L 9/14* (2006.01)
*G06Q 20/08* (2012.01)
*H04L 9/00* (2022.01)

(56) References Cited

U.S. PATENT DOCUMENTS

| | | | |
|---|---|---|---|
| 10,528,551 | B2 | 1/2020 | Li et al. |
| 10,788,988 | B1* | 9/2020 | Lary ................... G06F 3/0619 |
| 2015/0310424 | A1* | 10/2015 | Myers ............... G06Q 20/3678 |
| | | | 705/69 |
| 2016/0080156 | A1* | 3/2016 | Kaliski, Jr. ........... H04L 9/3247 |
| | | | 713/176 |
| 2016/0164884 | A1 | 6/2016 | Sriram et al. |
| 2016/0330031 | A1* | 11/2016 | Drego .................. H04L 9/3239 |
| 2016/0342989 | A1 | 11/2016 | Davis |
| 2016/0371509 | A1* | 12/2016 | Unitt ....................... H04L 63/12 |
| 2017/0031676 | A1* | 2/2017 | Cecchetti .................. G06F 8/65 |
| 2017/0091750 | A1 | 3/2017 | Maim |
| 2017/0155515 | A1 | 6/2017 | Androulaki |
| 2017/0232300 | A1* | 8/2017 | Tran ........................ H04L 67/12 |
| | | | 434/247 |
| 2017/0236120 | A1* | 8/2017 | Herlihy .............. G06Q 20/3827 |
| | | | 705/67 |
| 2017/0295157 | A1* | 10/2017 | Chavez ................. H04B 1/3816 |
| 2018/0011893 | A1* | 1/2018 | Kimura ............... G06F 16/9027 |
| 2019/0004768 | A1* | 1/2019 | Li ............................. G06F 7/24 |
| 2019/0036906 | A1* | 1/2019 | Biyani ................ H04L 63/0807 |
| 2019/0102409 | A1 | 4/2019 | Shi et al. |
| 2019/0147065 | A1* | 5/2019 | Maeda .................. H04L 9/0637 |
| | | | 380/37 |
| 2019/0356469 | A1* | 11/2019 | Deshpande ........... H04L 9/3265 |
| 2020/0202312 | A1* | 6/2020 | Destefanis .............. H04L 47/38 |
| 2020/0356991 | A1* | 11/2020 | Saraniecki .............. G06Q 20/10 |
| 2020/0410488 | A1* | 12/2020 | Srinivasan ............... G06F 21/64 |

FOREIGN PATENT DOCUMENTS

| | | |
|---|---|---|
| JP | 2018132931 A | 8/2018 |
| JP | 2020512757 A | 4/2020 |
| WO | 2017021155 A1 | 2/2017 |
| WO | WO-2018234988 A1 * 12/2018 ........... G06F 9/5016 |

OTHER PUBLICATIONS

Hearn, M.; "Corda: A Distributed Ledger"; Corda, a decentralized global database for decentralized app development, Version 0.5; Nov. 29, 2016.

IPCOM000214471D; "A Method to Validate the Integrity of Individual Transactions and Related Interdependent Transactions with Possible Error Recovery"; http://ip.com/IPCOM/000214471D; Jan. 30, 2012.

Anonymously; "Blockchain Transaction Index Mechanism"; http://ip.com/IPCOM/000249524D; Mar. 2, 2017.

Anonymously; "System and Method for Aggregated Blockchain Credibility"; http://ip.com/IPCOM/000249067D; Jan. 31, 2017.

International Search Report and Written Opinion issued in the corresponding International Application No. PCT/IB2018/057836; dated Feb. 27, 2019.

JP Office Action issued in a related JP Patent Application, dated Dec. 3, 2021.

* cited by examiner

OPTIMIZATION OF HIGH VOLUME TRANSACTION PERFORMANCE ON A BLOCKCHAIN

TECHNICAL FIELD

This application generally relates to transaction management on a blockchain, and more particularly, to optimization of high volume transaction performance on a blockchain.

BACKGROUND

A blockchain may be used as a public ledger to store any type of information. Although, primarily used for financial transactions, a blockchain can store any type of information including assets (i.e., products, packages, services, status, etc.). A decentralized scheme transfers authority and trust to a decentralized network and enables its nodes to continuously and sequentially record their transactions on a public "block", creating a unique "chain" referred to as a blockchain. Cryptography, via hash codes, is used to secure an authentication of a transaction source and removes a central intermediary.

In many use cases, the high volume and time sensitive transactions, such as stocks and equities trading, require optimal timing. For a blockchain to address high-volume transactions, a blockchain network infrastructure requires components to ensure not only the timely ordering of the transactions but also ensure transaction processing with speed and non-repudiation, which is a component to certain entities, such as clearinghouses and others that perform such functions. In general, a blockchain related transactions should be ordered correctly and be committed without delay.

SUMMARY

One example embodiment may provide a method that includes one or more of identifying a newly proposed transaction of a blockchain, initiating a consensus operation to determine whether to authorize the newly proposed transaction, retrieving a key-value pair identified from a previous transaction, comparing an index value associated with the key-value pair of the previous transaction to an index value associated with a key-value pair of the newly proposed transaction, and providing an affirmative consensus to accept the newly proposed transaction in the blockchain when the index value associated with the key-value pair of the previous transaction is contiguously sequential with the index value associated with the key-value pair of the newly proposed transaction.

Another example embodiment may include an apparatus that includes a processor configured to perform one or more of identify a newly proposed transaction of a blockchain, initiate a consensus operation to determine whether to authorize the newly proposed transaction, retrieve a key-value pair identified from a previous transaction, compare an index value associated with the key-value pair of the previous transaction to an index value associated with a key-value pair of the newly proposed transaction, and provide an affirmative consensus to accept the newly proposed transaction in the blockchain when the index value associated with the key-value pair of the previous transaction is contiguously sequential with the index value associated with the key-value pair of the newly proposed transaction.

Still another example embodiment may include a non-transitory computer readable storage medium configured to store instructions that when executed cause a processor to perform one or more of identifying a newly proposed transaction of a blockchain, initiating a consensus operation to determine whether to authorize the newly proposed transaction, retrieving a key-value pair identified from a previous transaction, comparing an index value associated with the key-value pair of the previous transaction to an index value associated with a key-value pair of the newly proposed transaction, and providing an affirmative consensus to accept the newly proposed transaction in the blockchain when the index value associated with the key-value pair of the previous transaction is contiguously sequential with the index value associated with the key-value pair of the newly proposed transaction.

DETAILED DESCRIPTION

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed, but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

The instant application in one embodiment relates to transaction management on a blockchain, and in another embodiment relates to ordering transactions and optimizing high volumes of transactions for optimal performance on a blockchain.

According to example embodiments, an application may be executed on a blockchain computing system platform, which is maintained by multiple validators using a consensus/validation mechanism. In one example, each block or transaction of a blockchain may contain a key-value pair, or a fixed number of key-value pairs. For example purposes, the terms block and transaction may be used interchangeably. Although blockchain blocks may include multiple blockchain transactions, both examples may require a consensus decision prior to being committed to a blockchain. The consensus management application may also perform maintaining information in key-value pairs, and keys may form a monotonic and contiguous sequence. Keys may be used as an index for querying, the consensus/validation procedure may enforce a recently-mined block/transaction and whether that block/transaction is considered valid depending on whether it carries the next key in an established key sequence. Once a block/transaction is appended, the value corresponding to its key is not permitted to be overwritten at a future block/transaction, thus enabling fast block retrieval.

Log/ledger/blockchain compaction/idempotence is a configuration and/or procedure for assuring a desired order of ledger data, with certainty, and ensuring optimal performance of the ordering, which leads to performance in processing transactions, due to a dependency, to meet demands of market infrastructure and provide non-repudiation. Consensus is a way for validating an order of network requests or transactions. The correct ordering of transactions is critical as many types of network transactions have a dependency on one or more prior transactions (e.g., account debits often have a dependency on prior credits). On a blockchain network, there is no single authority that determines the transaction order, instead, each blockchain node (peer) has a say in establishing the transaction order by implementing a network consensus protocol. Consensus, therefore, ensures that a quorum of nodes agree on the order in which transactions are appended to the shared ledger. By resolving any discrepancies in the proposed transaction order, consensus provides that all network nodes are operating on an identical blockchain. In other words, consensus guarantees the integrity and consistency of blockchain network transactions.

A consensus/validation configuration procedure may provide a log compaction where a first value of each key is maintained. This approach may provide fast retrieval since a contiguous sequence is also a predictable sequence, and one that can be processed and queried quickly. This consensus mechanism enforces contiguous sequences, and therefore enables a querying node to identify a value of a key in an efficient and easy manner. This approach also assists newly-connected blockchain nodes to respond to queries faster. For example, there is no need to parse the entire chain of blocks in order to locate a particular transaction when key values are known.

Figure 1A:
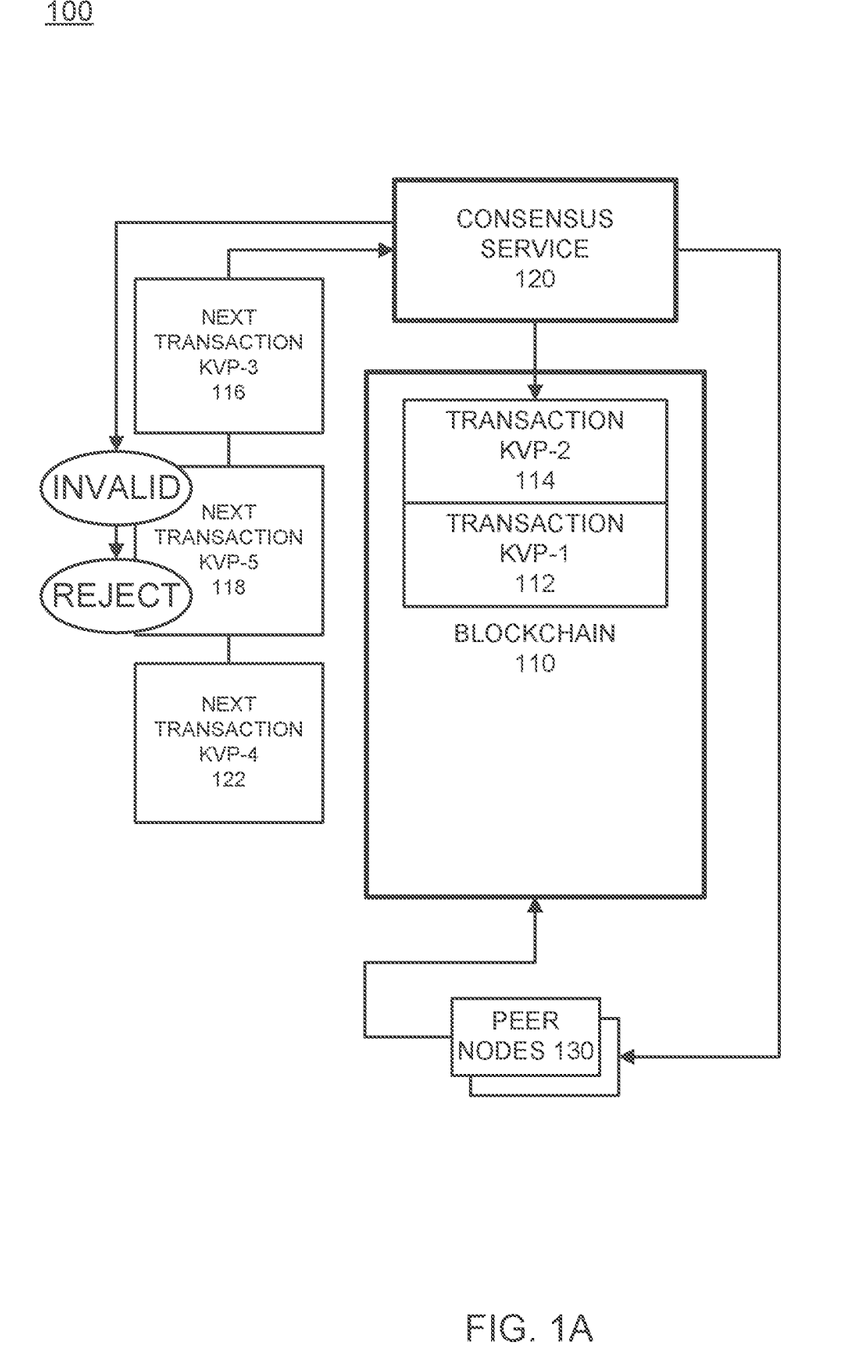
FIG. 1A illustrates a logic diagram of processing consensus decisions via a consensus service module, according to example embodiments.

FIG. 1A illustrates a logic diagram of processing consensus decisions via a consensus service module, according to example embodiments. Referring to FIG. 1A, the configuration 100 includes a blockchain configuration 110 configured to receive and store transactions and/or new blocks based on a peer node 130 consensus. In operation, a consensus service 120 may be a software module that is configured to receive transactions 116, 118 and/or 122 and determine whether the transactions can be admitted to the ledger. In this example, the blockchain 110 stores transactions 112 and 114, which have already been admitted to the blockchain via consensus from the peers 130. As new transactions are received, the key-value pairs "KVP" are identified by the consensus service module 120 to determine contiguous succession, such as one right after the other, 1, 2, 3, etc. In the event that the next transaction does not carry a contiguously successive numerical identifier, the transaction may be deemed invalid and may be rejected. For instance, transaction 118 has a KVP value of 5 and is being processed after 116 so the next identifier would be "4" not "5". Therefore, this transaction will be identified as invalid and rejected. The transaction thereafter, 122, has the correct KVP-4, which follows from KVP-3, and will thus be accepted and committed.

Figure 1B:
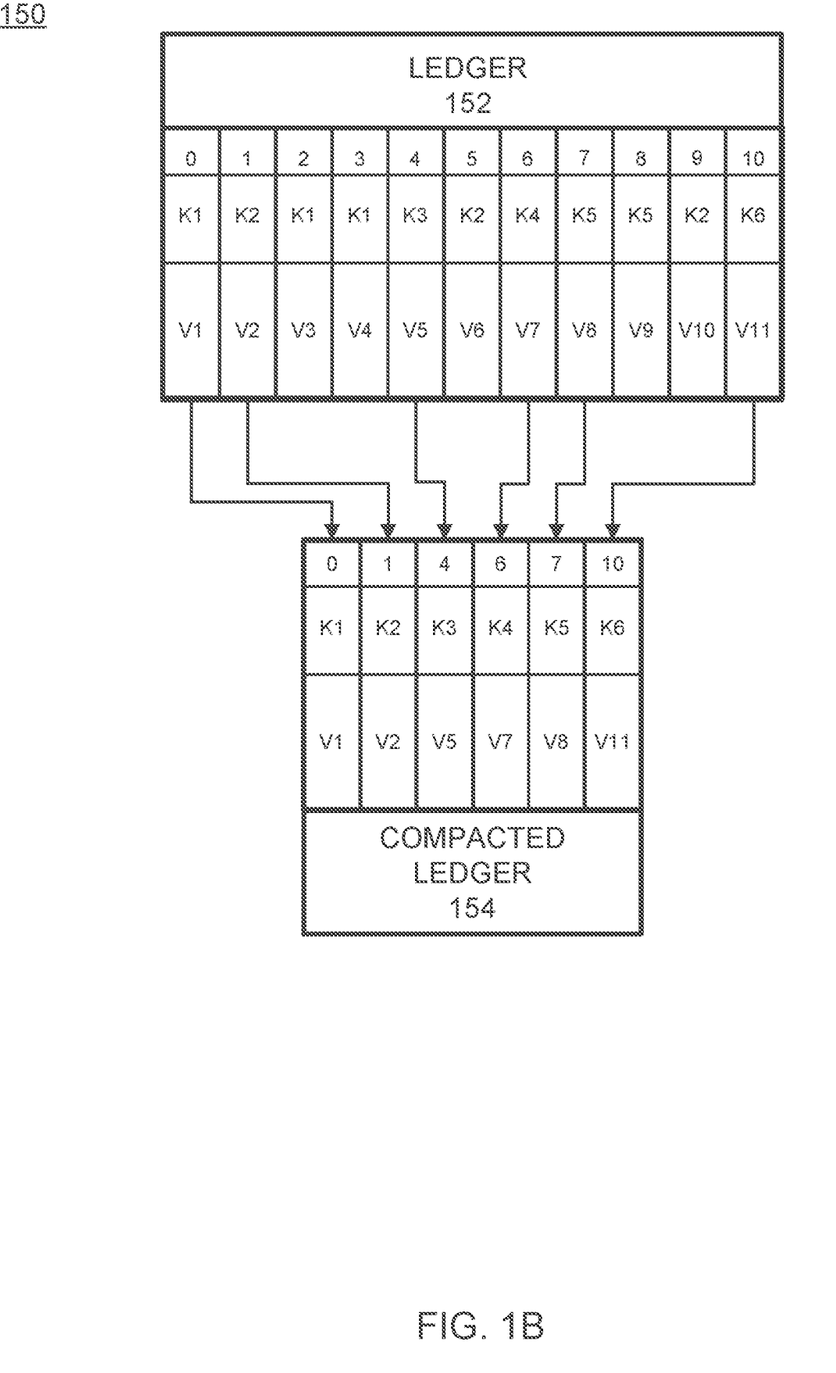
FIG. 1B illustrates an example ledger compaction operation, according to example embodiments.

FIG. 1B illustrates a ledger compaction example according to example embodiments. Referring to FIG. 1B, the ledger compaction procedure 150 may include a regular ledger 152 with 11 entries 0-10. Each entry has a key (K1-K6), a numerical identifier, such as a counter, a time value, etc., and a value which is associated with that entry, thus creating a key-value pair K/V. As may be observed from the original non-compacted ledger 152, the keys are used more than once and any reference to a particular key value, such as K1 will have multiple values associated with its use. However, assuming only the first instance of the key is relevant and the monotonic sequence of contiguous key values is required by the compaction procedure, then the new ordered set of contiguous key values K1-K6 will result in a compacted ledger 154, which is then deemed correct. This provides an opportunity for fast retrieval of contiguous entries.

The proposed log compaction mechanism according to example embodiments offers read idempotence so the same log prefix will always be returned. Referring to FIG. 1B, with a traditional log compaction mechanism, the log prefix is K1 when there are only two entries added to the ledger, but it becomes K2 when the third entry (K1/V3) is added. The log compaction mechanism according to example embodiments returns K1 as the prefix at all times.

Figure 2:
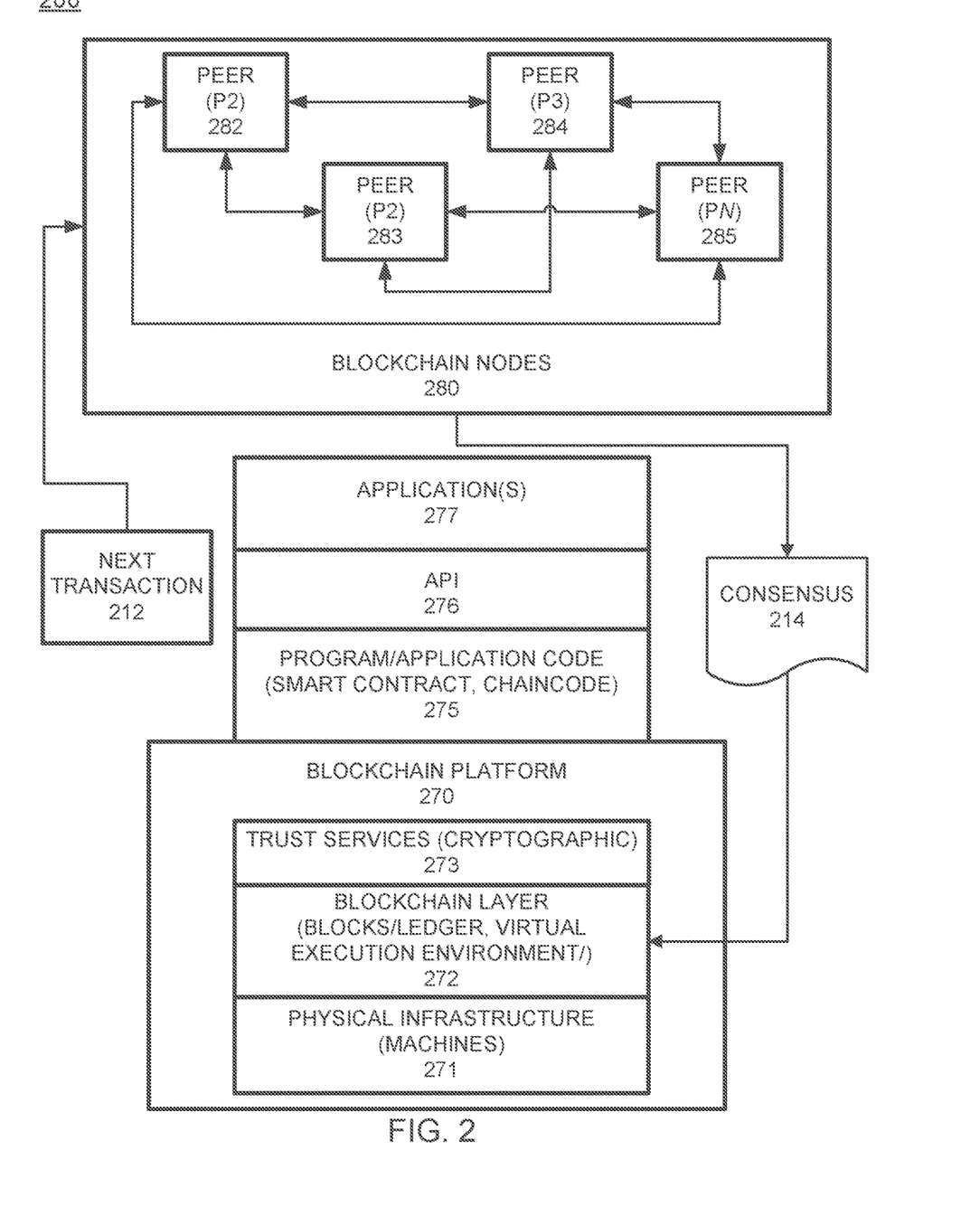
FIG. 2 illustrates an example blockchain configuration for performing blockchain consensus management, according to example embodiments.

FIG. 2 illustrates an example blockchain configuration for performing transaction scheduling and consensus management, according to example embodiments. Referring to FIG. 2, the blockchain system 200 may include certain common blockchain elements, such as a group of blockchain nodes 280, which may be assigned peer blockchain nodes 'peer nodes' 282-285, which participate in the blockchain transaction addition and validation process (consensus). Any of the blockchain peer nodes 280 may initiate new transactions and seek to write to the blockchain immutable ledger 272, a copy of which is stored on the underpinning physical infrastructure 271 of the blockchain 270. In this configuration, the customized blockchain configuration may include one or applications 277 which are linked to APIs 276 to access and execute stored program/application code (e.g., chain code and/or smart contracts) 275, which are created according to the customized configuration sought by the participants and can maintain their own state, control its own assets, and receive external information. This code can be deployed as a transaction and installed, via appending to the distributed ledger, on all blockchain peer nodes.

As described herein, a smart contract is an executable code which is registered, stored, and replicated with a blockchain (e.g., distributed network of blockchain peers). A transaction is an execution of the smart contract code which can be performed in response to conditions associated with the smart contract being satisfied. The executing of the smart contract may trigger a trusted modification to a state of a digital blockchain ledger. The modification to the blockchain ledger caused by the smart contract execution may be automatically replicated throughout the distributed network of blockchain peers through one or more consensus protocols.

The blockchain platform 270 includes the various layers of blockchain data, services (e.g., cryptographic trust services, virtual execution environment), and underpinning physical computer infrastructure necessary to receive and store new transactions and provide access to auditors, which are seeking to access data entries. The blockchain layer 272 exposes an interface that provides access to the virtual execution environment necessary to process the program code and engage the physical platform 271. Cryptographic trust services 273 are used to verify transactions and maintain private information.

The blockchain configuration of FIG. 2 may process and execute program/application code 275 by way of the interfaces exposed, and the services provided, by blockchain platform 270. The code may control blockchain assets, for example, it can store and transfer data, and may be executed by the blockchain, for example, in the form of a smart contract and associated chain code with conditions or other code elements subject to its execution. The smart contracts 275 may be created to execute reminders, updates, and/or other notifications subject to the changes, updates, etc. The smart contracts can themselves be used to identify rules associated with authorization and access requirements and usage. In one example, a new transaction 212 may be identified by the peer nodes 280. The nodes may reach consensus 214 and permit the transaction to be committed to the blockchain ledger 272 provided that certain conditions are satisfied. For example, the transaction may require a key-value pair via the consensus service to in order to be approved by consensus peers. In this case, the peers may identify the previous transaction(s) in the blockchain and determine whether the present transaction is identified as having a successively contiguous key-value pair identifier (next in number sequence). This information can be easily identified by the transaction key-value pair identification number, which can be identified and compared to verify and provide consensus to permit the transaction to be committed to the blockchain.

Figure 3:
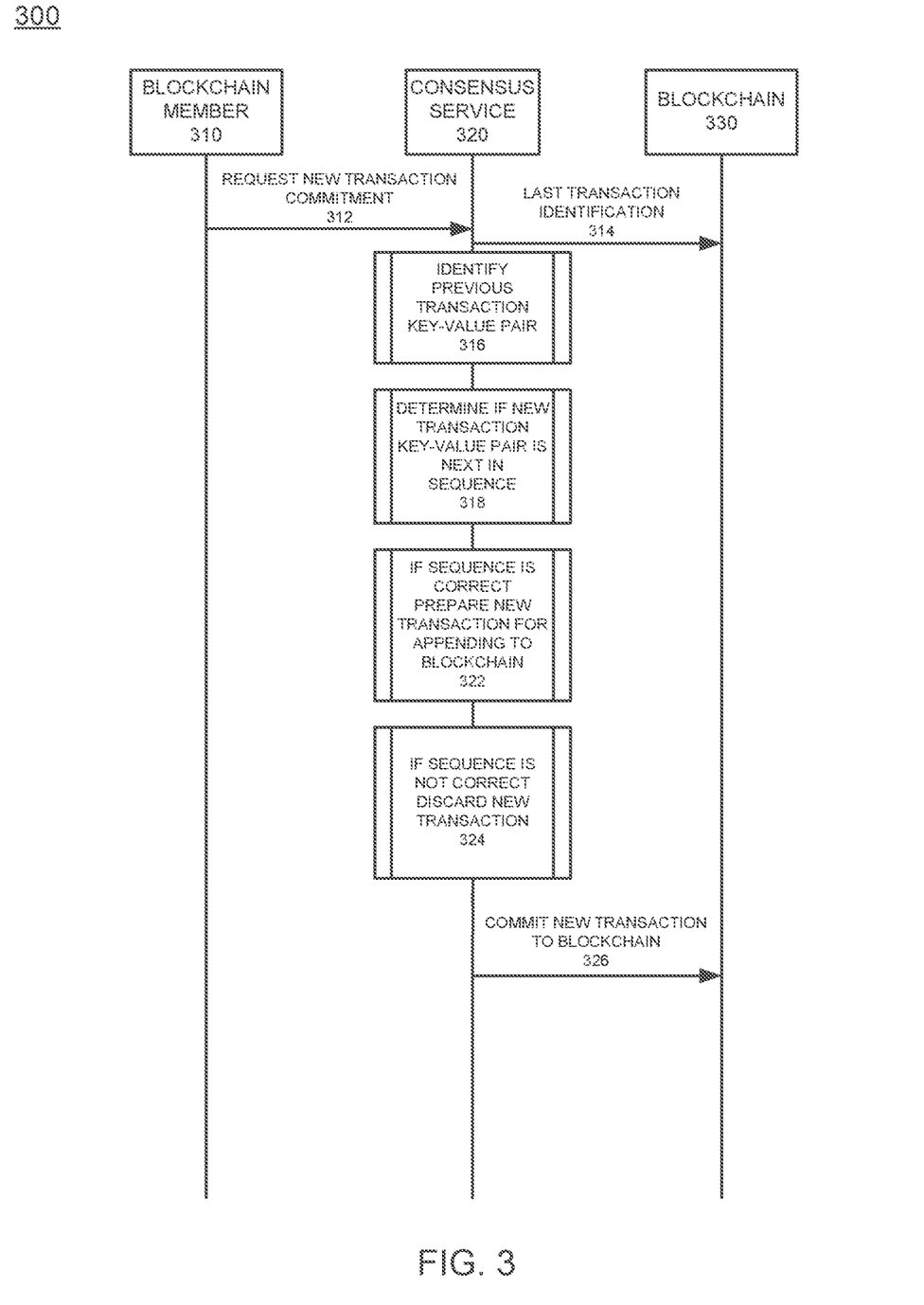
FIG. 3 illustrates a system messaging diagram for processing transaction consensus processing, according to example embodiments.

FIG. 3 illustrates a system messaging diagram for processing transaction consensus processing, according to example embodiments. Referring to FIG. 3, in this example system configuration 300, the blockchain member 310 may be responsible for submitting a transaction 312 for commitment to the blockchain 330. The consensus service 320 may identify the request and the new transaction and audit previous transactions 314 for identification of sequence values associated with the key-value pairs by identifying the blockchain transactions. The last value identified 316 may be compared to the new transaction for a successively contiguous sequence 318. The sequence, if successively contiguous, then the transaction may be committed accordingly 326 and appended to the ledger without delay 322. If the sequence is not correct then the new transaction may be discarded 324.

Figure 4A:
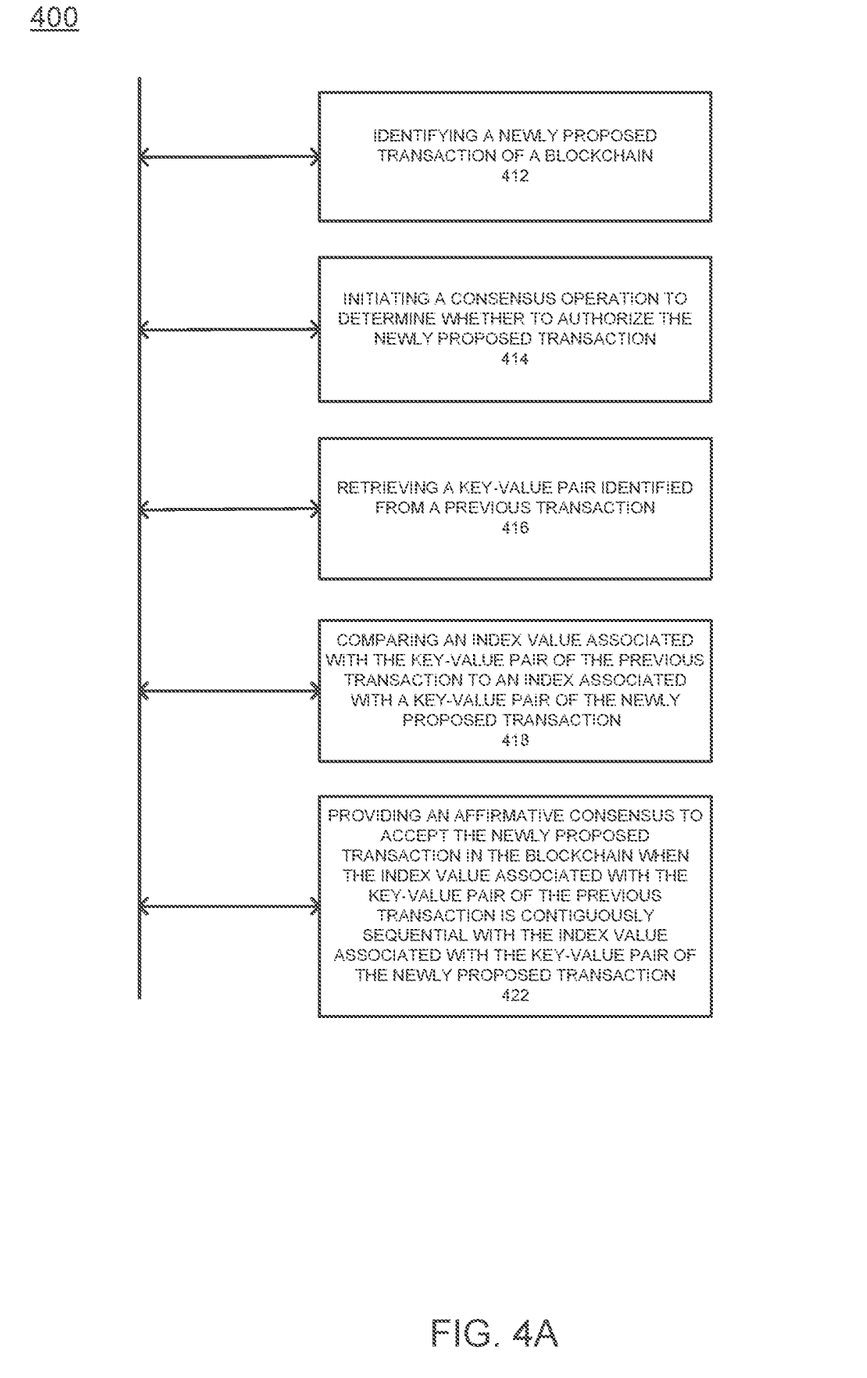
FIG. 4A illustrates a flow diagram of an example method of managing consensus processing of transactions, according to example embodiments.

FIG. 4A illustrates a flow diagram of an example method of managing consensus processing of transactions, according to example embodiments. Referring to FIG. 4A, the method 400 may include identifying a newly proposed transaction of a blockchain 412, initiating a consensus operation to determine whether to authorize the newly proposed transaction 414, retrieving a key-value pair identified from a previous transaction 416, comparing an index value associated with the key-value pair of the previous transaction to an index value associated with a key-value pair of the newly proposed transaction 418, and providing an affirmative consensus to accept the newly proposed transaction in the blockchain when the index value associated with the key-value pair of the previous transaction is contiguously sequential with the index value associated with the key-value pair of the newly proposed transaction 422.

The method may also include rejecting the newly proposed transaction when the index value associated with the key-value pair of the previous transaction is not contiguously sequential with the index value associated with the key-value pair of the newly proposed transaction, determining the newly proposed transaction is out-of-sequence with one or more other transactions when the index value associated with the key-value pair of the previous transaction is not contiguously sequential with the index value associated with the key-value pair of the newly proposed transaction. The consensus operation invokes a plurality of validator node members of the blockchain. Only one validator node member of the blockchain is required to validate and append the newly proposed transaction to the blockchain. The method may also include accessing the blockchain, extracting a plurality of blockchain transactions having a first instance of a key value, generating a compacted ledger based on the plurality of blockchain transactions, and where the compacted ledger includes the plurality of blockchain transactions arranged as a contiguously sequential set of key values.

The method may also include receiving a proposed key-value pair for the newly proposed transaction from a validator member of the blockchain, and accepting or rejecting the proposed key-value pair via a leader member of the blockchain based on previously accepted key-value pairs, and assigning the index value associated with the key-value pair of the newly proposed transaction to the newly proposed transaction via the leader member of the blockchain.

Figure 4B:
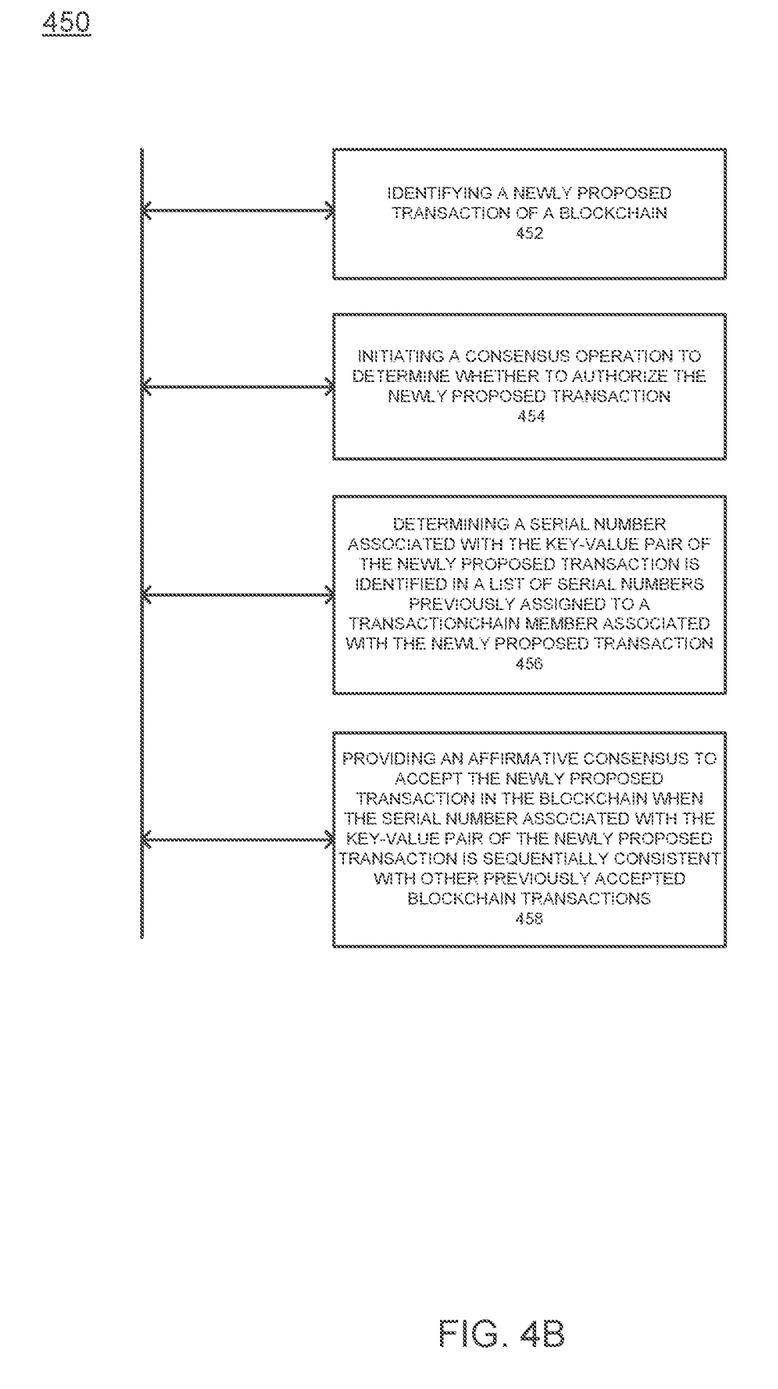
FIG. 4B illustrates another flow diagram of an example method of managing consensus processing of transactions, according to example embodiments.

FIG. 4B illustrates another flow diagram of an example method of managing consensus processing of transactions, according to example embodiments. Referring to FIG. 4B, the method 450 may include identifying a newly proposed transaction of a blockchain 452, initiating a consensus operation to determine whether to authorize the newly proposed transaction 454, determining a serial number associated with the key-value pair of the newly proposed transaction is identified in a list of serial numbers previously assigned to a blockchain member associated with the newly proposed transaction 456, and providing an affirmative consensus to accept the newly proposed transaction in the blockchain when the serial number associated with the key-value pair of the newly proposed transaction is sequentially consistent with other previously accepted blockchain transactions 458.

In this alternative example embodiment, the key-value pairs are not required to have a specific sequence number but instead may have a bar code or serial number that was selected and assigned to the new block from a pool of available serial numbers assigned previously. The serial numbers can be tracked back to a time and blockchain member to which they were assigned. The serial number may be linked to a time and sequence that ensures the block or transaction are accounted for and are in sequence with other serial numbers of previous blocks, transaction and the corresponding blockchain members. This labeling approach provides a way to track transactions for accuracy and ordering purposes. Determining whether the serial number is sequentially consistent with other blocks may include identifying a time and assignment of the serial number in questions, and if the identification can be made to the assignment of the serial numbers as being made prior to other serial numbers in previous blocks then the transaction is acceptable. Also, a time frame may be used as a window of acceptable serial number assignment as well when determining whether consensus should be approved to commit the transaction or block.

Figure 4C:
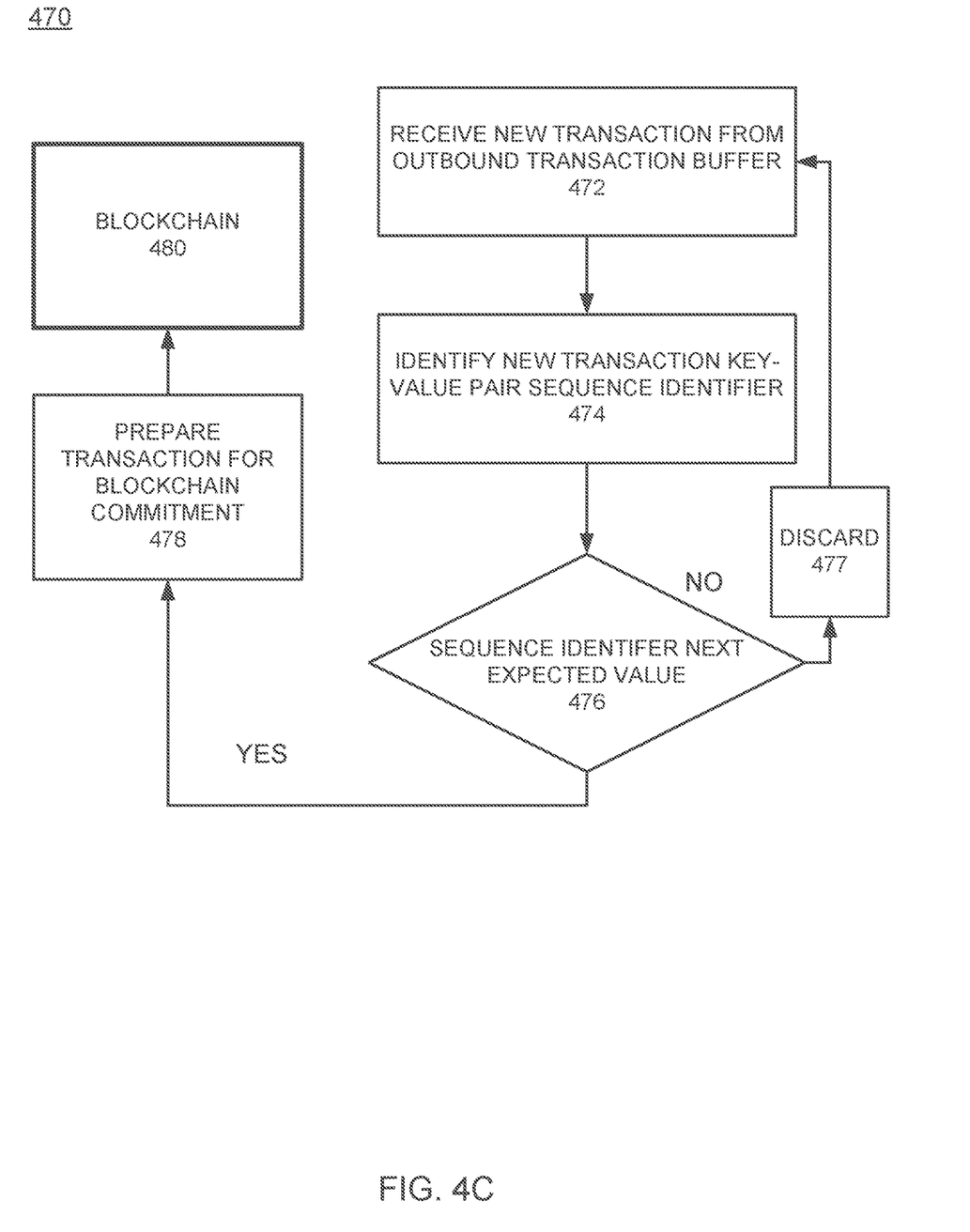
FIG. 4C illustrates logic flow diagram of an example method of managing consensus processing of transactions, according to example embodiments.

FIG. 4C illustrates logic flow diagram of an example method of managing consensus processing of transactions, according to example embodiments. Referring to FIG. 4C, the logic configuration 470 may include receiving a new transaction from an outbound transaction buffer 472 used to buffer transactions in order which require consensus. The new transaction may have its key-value pair identified and a corresponding sequence number extracted 474. The information is compared to a next expected value 476 and may be discarded 477 if not successively contiguous with the previous value. Or, if the sequence is consistent, the transaction is prepared for blockchain commitment 478 and appended to the blockchain 480.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 5 illustrates an example computer system architecture 500, which may represent or be integrated in any of the above-described components, etc.

Figure 5:
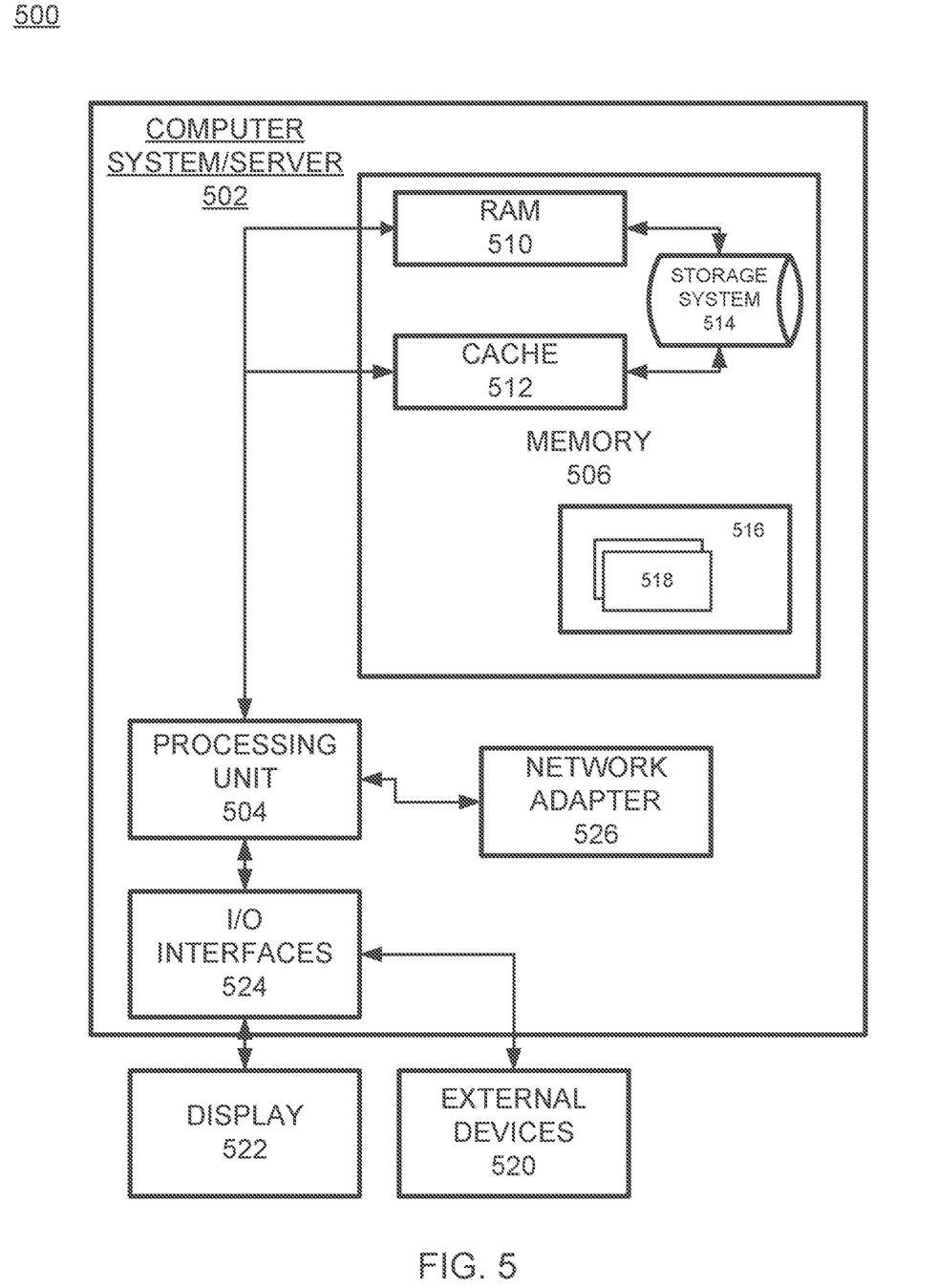
FIG. 5 illustrates an example computer system/server configured to support one or more of the example embodiments.

FIG. 5 is not intended to suggest any limitation as to the scope of use or functionality of embodiments of the application described herein. Regardless, the computing node 500 is capable of being implemented and/or performing any of the functionality set forth hereinabove.

In computing node 500 there is a computer system/server 502, which is operational with numerous other general purpose or special purpose computing system environments or configurations. Examples of well-known computing systems, environments, and/or configurations that may be suitable for use with computer system/server 502 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 502 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 502 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 502 in cloud computing node 500 is shown in the form of a general-purpose computing device. The components of computer system/server 502 may include, but are not limited to, one or more processors or processing units 504, a system memory 506, and a bus that couples various system components including system memory 506 to processor 504.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 502 typically includes a variety of computer system readable media. Such media may be any available media that is accessible by computer system/server 502, and it includes both volatile and non-volatile media, removable and non-removable media. System memory 506, in one embodiment, implements the various examples of the disclosed embodiments. The system memory 506 can include computer system readable media in the form of volatile memory, such as random access memory (RAM) 510 and/or cache memory 512. Computer system/server 502 may further include other removable/non-removable, volatile/non-volatile computer system storage media. By way of example only, storage system 514 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 506 may include at least one program product having a set (e.g., at least one) of program modules that are configured to carry out the functions of various embodiments of the application.

Program/utility 516, having a set (at least one) of program modules 518, may be stored in memory 506 by way of example, and not limitation, as well as an operating system, one or more application programs, other program modules, and program data. Each of the operating system, one or more application programs, other program modules, and program data or some combination thereof, may include an implementation of a networking environment. Program modules 518 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 502 may also communicate with one or more external devices 520 such as a keyboard, a pointing device, a display 522, etc.; one or more devices that enable a user to interact with computer system/server 502; and/or any devices (e.g., network card, modem, etc.) that enable computer system/server 502 to communicate with one or more other computing devices. Such communication can occur via I/O interfaces 524. Still yet, computer system/server 502 can communicate with one or more networks such as a local area network (LAN), a general wide area network (WAN), and/or a public network (e.g., the Internet) via network adapter 526. As depicted, network adapter 526 communicates with the other components of computer system/server 502 via a bus. It should be understood that although not shown, other hardware and/or software components could be used in conjunction with computer system/server 502. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising:
retrieving a sequence of key-value pairs that have been appended to a sequence of previous blockchain transactions, respectively, from a blockchain ledger, wherein the sequence of key-value pairs comprise a sequence of numerical key identifiers paired with a sequence of values, respectively;
removing a key-value pair from the sequence of key-value pairs which comprises a numerical key identifier that has already been added to another key-value pair earlier in the sequence of key-value pairs, to generate a compacted sequence of key-value pairs;
receiving a newly proposed blockchain transaction which comprises a new key-value pair including a numerical key identifier paired with a value;
querying the compacted sequence of key-value pairs via a blockchain peer for a sequence of numerical key identifiers of the compacted sequence of key-value pairs;
determining whether the numerical key identifier of the new key-value pair is next in the sequence of numerical key identifiers of the compacted sequence of key value pairs by comparing the numerical key identifier of the new key-value pair to a last numerical key identifier in the sequence of numerical key identifiers of the compacted sequence of key-value pairs;
determining, via a consensus service that a quorum of blockchain peers of the blockchain network have reached a consensus that the numerical key identifier of the new key-value pair is next in the sequence of numerical key identifiers of the compacted sequence of key-value pairs; and
committing the newly proposed blockchain transaction to a block of the blockchain ledger.

2. The method of claim 1, further comprising:
in response to determining the numerical key identifier of the new key-value pair is not next in the compacted sequence of numerical key identifiers, discarding the newly proposed blockchain transaction.

3. The method of claim 1, further comprising:
determining the newly proposed blockchain transaction is out-of-sequence with one or more other blockchain transactions when the numerical key identifier of the new key-value pair is not next in the sequence of numerical key identifiers.

4. The method of claim 1, wherein the committing comprises invoking a validator node of the blockchain to append the newly proposed blockchain transaction to the block of the blockchain.

5. The method of claim 1, further comprising:
accepting or rejecting the new key-value pair via a leader member of the blockchain ledger based on previously accepted key-value pairs.

6. The method of claim 5, further comprising:
assigning the numerical key identifier associated with the new key-value pair of the newly proposed blockchain transaction to the newly proposed blockchain transaction via the leader member of the blockchain.

7. An apparatus, comprising:
a processor configured to:
retrieve a sequence of key-value pairs that have been appended to a sequence of previous blockchain transactions, respectively, from a blockchain ledger, wherein the sequence of key-value pairs comprise a sequence of numerical key identifiers paired with a sequence of values, respectively;
remove a key-value pair from the sequence of key-value pairs which a numerical key identifier that has already been added to another key-value pair earlier in the sequence of key-value pairs, to generate a compacted sequence of key-value pairs;
receive a newly proposed blockchain transaction which comprises a new key-value pair including a numerical key identifier paired with a value;
query the compacted sequence of key-value pairs via a blockchain peer for a sequence of numerical key identifiers of the compacted sequence of key-value pairs;
determine whether the numerical key identifier of the new key-value pair is next in the sequence of numerical key identifiers of the compacted sequence of key-value pairs by comparing the numerical key identifier of the new key-value pair to a last numerical key identifier in the sequence of numerical key identifiers of the compacted sequence of key-value pairs;
determine, via a consensus service that a quorum of blockchain peers of the blockchain network have reached a consensus that the numerical key identifier of the new key-value pair is the next in the sequence of numerical key identifiers of the compacted sequence of key-value pairs; and
commit the newly proposed blockchain transaction to a block of the blockchain ledger.

8. The apparatus of claim 7, wherein the processor is further configured to:
in response to determining the numerical key identifier is not next in the sequence of numerical key identifiers, discard the newly proposed blockchain transaction.

9. The apparatus of claim 7, wherein the processor is further configured to:
determine the newly proposed blockchain transaction is out-of-sequence with one or more other blockchain transactions when the numerical key identifier of the new key-value pair is not next in the sequence of numerical key identifiers.

10. The apparatus of claim 7, wherein the processor is configured to invoke a validator node to append the newly proposed blockchain transaction to the block of the blockchain.

11. The apparatus of claim 7,
wherein the processor is further configured to accept or reject the new key-value pair via a leader member of the blockchain ledger based on previously accepted key-value pairs.

12. The apparatus of claim 11, wherein the processor is further configured to:
assign the numerical key identifier associated with the new key-value pair of the newly proposed blockchain transaction to the newly proposed blockchain transaction via the leader member of the blockchain.

13. A non-transitory computer readable storage medium configured to store instructions that when executed cause a processor to perform:
retrieving a sequence of key-value pairs that have been appended to a sequence of previous blockchain transactions, respectively, from a blockchain ledger, wherein the sequence of key-value pairs comprise a sequence of numerical key identifiers paired with a sequence of values, respectively;

removing a key-value pair from the sequence of key-value pairs which comprises a numerical key identifier that that has already been added to another key-value pair earlier in the sequence of key-value pairs, to generate a compacted sequence of key-value pairs;

receiving a newly proposed blockchain transaction which comprises a new key-value pair including a numerical key identifier paired with a value;

querying the compacted sequence of key-value pairs via a blockchain peer for a sequence of numerical key identifiers of the compacted sequence of key-value pairs;

determining whether the numerical key identifier of the new key-value pair is next in the sequence of numerical key identifiers of the compacted sequence of numerical key-value pairs by comparing the key to a last key in the sequence of numerical key identifiers of the compacted sequence of key-value pairs;

determining, via a consensus service that a quorum of blockchain peers of the blockchain network have reached a consensus that the numerical key identifier of the new key-value pair is next in the sequence of numerical key identifiers of the compacted sequence of key-value pairs; and committing the newly proposed blockchain transaction to a block of the blockchain ledger.

14. The non-transitory computer readable storage medium of claim 13, wherein the processor is further configured to perform:
in response to determining the numerical key identifier of the new key-value pair is not next in the sequence of numerical key identifiers, discarding the newly proposed blockchain transaction.

15. The non-transitory computer readable storage medium of claim 13, wherein the processor is further configured to perform:
determining the newly proposed blockchain transaction is out-of-sequence with one or more other blockchain transactions when the numerical key identifier of the new key-value pair is not next in the sequence of numerical key identifiers.

16. The non-transitory computer readable storage medium of claim 13, wherein the committing comprises invoking a validator node of the blockchain to append the newly proposed blockchain transaction to the block of the blockchain.

17. The non-transitory computer readable storage medium of claim 13, wherein the processor is further configured to perform: accepting or rejecting the new key-value pair via a leader member of the blockchain ledger based on previously accepted key-value pairs.

* * * * *